Nov. 10, 1970 R. W. CLOUD 3,539,703
HIGH VOLTAGE TERMINATION APPARATUS FOR HIGH VOLTAGE CABLES
AND PIPE-TYPE TRANSMISSION LINES
Filed Oct. 23, 1968 2 Sheets-Sheet 1

INVENTOR
ROBERT W. CLOUD
BY Irwin C. Shaw
ATTORNEY

United States Patent Office 3,539,703
Patented Nov. 10, 1970

3,539,703
HIGH VOLTAGE TERMINATION APPARATUS FOR HIGH VOLTAGE CABLES AND PIPE-TYPE TRANSMISSION LINES
Robert W. Cloud, Largo, Fla., assignor to High Voltage Power Corporation, Burlington, Mass., a corporation of Massachusetts
Filed Oct. 23, 1968, Ser. No. 769,833
Int. Cl. H02g 15/02; H01b 17/28
U.S. Cl. 174—19
5 Claims

ABSTRACT OF THE DISCLOSURE

A high voltage termination apparatus for bringing a high voltage conductor from one insulating medium to another. Capacitive-resistive division in the form of concentric mating rings or resistively coated condenser tape is used to provide gradient control under high voltage conditions as well as constaining the radial field within predetermined spatial limits.

BACKGROUND OF THE INVENTION

With the anticipated growth in electrical power utilization voltage levels will soon be required which are uncontrollable with present day equipment. This includes not only the terminal apparatus but also associated induction apparatus and systems for power transmission. For example, it is well-known that present technology of transformers and reactors cannot economically or practically be extended to cope with the high power requirements demanded in the near future. Then too, there are severe technical and esthetic problems associated with present power transmission systems. Overhead lines are unpractical because of the high cost of rights of way and their unsightly appearance. On the other hand, conventional underground transmission lines with solid or liquid insulation are not favorable for maintaining the high voltage gradients and for accommodating the changes in conductor length as a function of current flow.

For example, the materials alone of conventional underground cables for power transmission immediately precludes their use under continuous high voltage and power operation. In general, an inner conductor is typically insulated with solid plastic and/or wrapped with tape having a paper base and impregnated with oil. A grounded sheath or outer conductor is then fitted over the insulated inner conductor and the insulating layer may then be put under pressure to reduce voids otherwise present in the insulating layer. It is known that this type of insulation will withstand gradients of greater than 1000 kilovolts per inch and, as such, the cable need be no greater than 2 to 3 inches in diameter. On the other hand, oil-paper type cable has severe restrictions where high power loads are required. The dielectric heating of the insulation thickness, and a breakdown in the insulation is inevitable.

To meet this problem another type of underground power transmission has recently been developed which uses an insulating gas to withstand the high voltage gradient between conductors. This system eliminates most of the problems that are characteristic of the conventional underground cable and, in addition, possesses many very desirable electrical characteristics. It has been found that a gas-insulated transmission line has a substantially reduced charging current and thereby increases the permissible length of line due to the low dielectric constant of the gas which is essentially unity even at high pressures. Moreover, the electrode geometry of rigid concentric or substantially concentric conductors can be made more favorable than the non-rigid conventional type resulting in a reduction in the comparative capacitance by a factor of four. In addition, negligible dielectric loss and a lower conductor resistance permit the use of larger cross-sections of conductors with gains in current and heat transfer capabilities and with greater choice of conductor materials. It is thought that the power handling capabilities will even surpass those of present overhead lines. The advantages and practicality of gas-insulated transmission lines are discussed in further detail in copending patent application Ser. No. 749,135 entitled, "Gas-Insulated Transmission Lines," by John G. Trump.

Yet whatever the type of underground electric power transmission, at some point the high voltage conductor must be terminated and insulated from ground keeping the gradient levels within tolerable and safe limits. Moreover, it is the termination of these underground high voltage cables that becomes a significant problem since the electric field will now be partly in the air or similar terminating medium. Since these type of terminating medias will generally be inferior as compared to that of the solid or pressurized gas cable insulation, the termination requires very special characteristics to keep the high voltage gradients below breakdown value in air.

And it is the purpose of this invention to describe generally a high voltage terminal apparatus and, more particularly, a high voltage cable termination wherein the high voltage conductor is taken from one insulating medium to another.

Substantial knowledge has been developed of cable terminations at present voltage levels. In fact, the simplest type of termination is achieved by peeling back the grounded outer conductor from the end of terminating cable and attaching a rounded metal terminal with a radius sufficient to keep the gradient below breakdown voltage to the high voltage conductor. A corona shield is frequently applied at the termination of the grounded sheath or outer conductor to reduce the field where the outer conductor would terminate in a sharp edge. A severe limitation occurs in this type of cable termination when the voltage is sufficiently great to produce electrical breakdown in the air in the vicinity of the outer conductor termination. For example, with a corona shield the dielectric of the transmission line is then in series with the thin air gap formed as the metal shield flairs away from the cable. A sufficiently high gradient will cause ionization in this gap and eventual failure. Often the gradient produced in the air is well above the 75 to 100 kv. per inch reduced to breakdown air when the voltage V is in the EHV range. The gradient in the air at the outer surface of the insulator is then given by the formula:

$$G = \frac{Vk}{r\left[\ln\frac{r}{r_1} + k\ln\frac{r_2}{r}\right]}$$

where $V$ = the voltage of the central conductor
$r$ = the radius of the insulating medium
$r_1$ = radius of the inner conductor
$r_2$ = radius of the outer conductor
$k$ = dielectric constant of the insulating medium This gradient could of course be reduced by reducing $r_1$, the radius of the inner conductor, but this reduction would be at the expense of even a higher maximum gradient in the insulating media. The resulting incipient discharge taking place between ground and the insulating cable wall would erode the cable if the voltage is AC and cause eventual insulation failure. On the other hand, when a DC voltage is being applied, charges coming from ground will build up on the insulating wall of the cable end, starting at the field termination, and will extend toward the open end until the radial gradients are low enough such that the air will not be overstressed. These bound charges are opposite in polarity to the high voltage inner conductor and effectively bring ground up toward the terminal end. Thus, the voltage has to be held on a length shorter than the peeled back length. Experience has shown that it is impractical to make a termination in air by this method once the voltage is over a few hundred kv.

The conventional method used to reduce the gradient at the shield termination consists of adding extra insulation near the shielded end. The diameter of this insulation can gradually be reduced toward the terminal end. Application of the insulation may be by wrapping with tape or by a casting of plastic. This insulated termination can then be placed in a weather-tight porcelain bushing if desired. The reduced gradient near the shield will then show that a buildup of insulation by a factor of three will significantly reduce the air gradient to a tolerable level.

The radial gradients midway in a long cable termination where the $$k \ln \frac{r_2}{r}$$

is large compared to $$\ln \frac{r}{r_1}$$

will, by substitution in the aforementioned equation be approximated by $$G = \frac{V}{r \ln \frac{r_2}{r}}$$

This is the same equation as for the gradient of a wire of radius $r$ in a cylinder of radius $r_2$. This indicates that surrounding grounded objects must be kept away from this bushing just as would be necessary from a high voltage conductor having a diameter equal to the insulation diameter.

These conventional types of cable terminations have several disadvantages. In the first instance, for very high voltages they are bulky and hard to manufacture. Furthermore, it is difficult to make the added insulation as void-free as one would like. Then too, there still is a large uncontrolled insulated surface which can become charged due to some incipient discharge which may very well distort the longitudinal field distributiton and a surface flashover can follow. Also internal heating due to dielectric losses is severe at the highest voltages.

SUMMARY OF THE INVENTION

It is, therefore, a general object of the present invention to provide a new and improved high voltage termination apparatus.

Another object of the present invention is to provide a new and improved high voltage termination apparatus for a transmission line utilizing either a solid or a gas-insulating medium.

A further object of the present invention is to provide a new and improved high voltage termination apparatus which is compatible with EHV power transmission.

Still another object of the present inventiton is to provide a new and improved high voltage transitional apparatus for a transmission line which is suitable for both AC and DC power transmission.

Yet a further object of the present invention is to provide a new and useful voltage transitional apparatus which is substantially smaller than like apparatus constructed under conventional systems.

In accordance with the general principle of the present inventiton a high voltage conductor is passed from one insulating medium into another such as from a transformer to air or a gas-insulated transmission line to air or gas at another pressure. The inner conductor carrying the high voltage is extended beyond the grounded outer conductor. Gradient control between the extended high voltage conductor and low voltage terminal is provided by a unique condenser-resistive division scheme which provides positive control in a minimum space for both AC and DC operation. For solid insulation, as in cables, the condenser-resistive division scheme is applied to the outer surface of the exposed insulation and may take the form of concentric mating rings tapered cylinders or a resistively coated insulating tape. For termination from gas or oil insulated lines to air, a porcelain or other suitable rigid insulating housing is used for mechanical support and containment. The warp can then be applied to the inner surface of this insulating housing.

Other objects and advantages of the present invention will become apparant in view of the following description when taken in conjunction with the accompanying drawings.

DESCRIPTION OF THE PREFERRED EMBODIMENT

This invention relates to a termination design which keeps the high radial gradients in the insulating medium of the cable, and distributes the longitudinal voltage gradient at the interface uniformly for AC, DC and surge voltages. The division of voltage along the surface is accomplished by capacitance and resistance division. Resistive division would not actually be necessary except for DC operation. As explained later, the capacitive division embodied in the principles of this invention is different from that of the conventional high voltage capacitor bushing although this shielded type of termination would also be usable in a bushing design.

Figure 1:
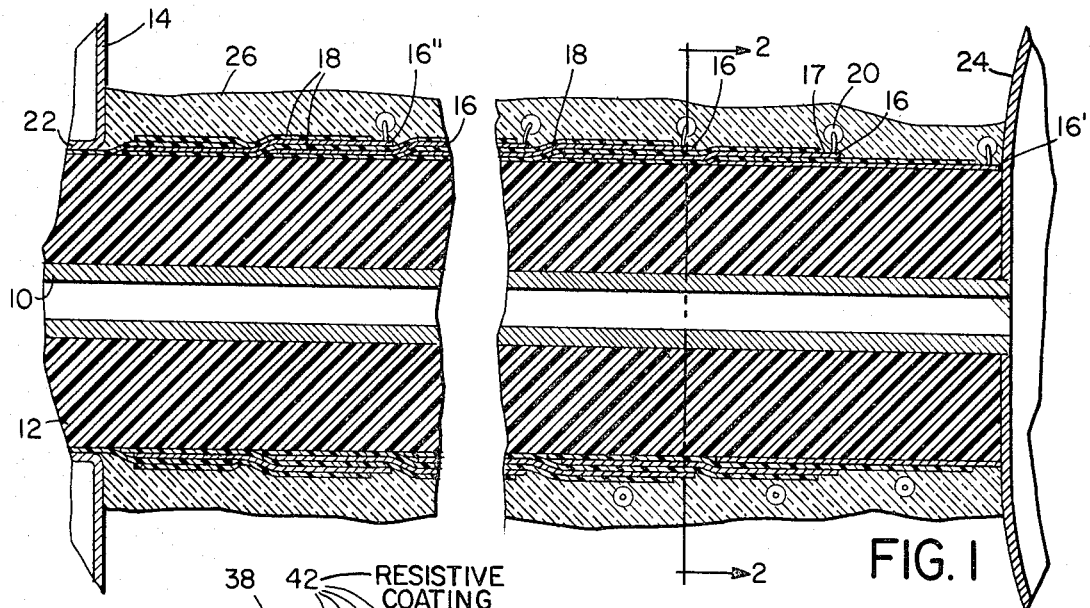
FIG. 1 is a longitudinal cross section of a cable termination showing a condenser-resistive division from the high voltage terminal to ground.
Figure 2:
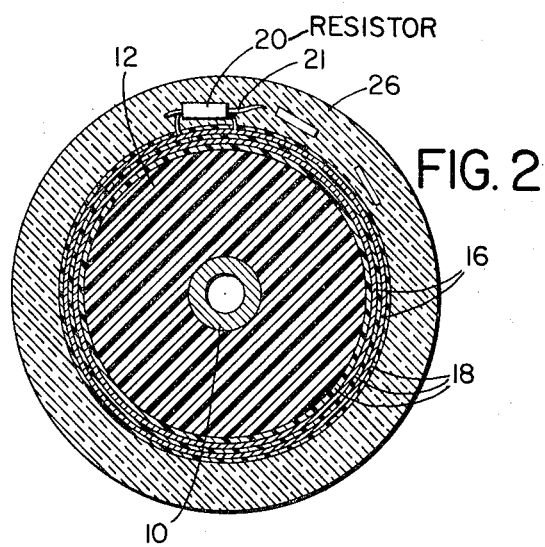
FIG. 2 is a radial cross section taken along line 2—2 of FIG. 1.

Referring now to FIGS. 1 and 2, a longitudinal and a radial cross section respectively is shown of a cable termination embodying the principles of the present invention. The inner conductor 10 of the power cable is shown surrounded by solid dielectric insulation 12. The outer conductor or sheath 22 is peeled back for a length required to hold the longitudinal gradient intact. A plurality of short cylindrical conducting sleeves 16 are allowed to partially overlap forming a complete electrostatic shield and thus preventing the electric field produced by the inner conductor from extending out of the cable insulation. These conducting sleeves 16, however, are insulated from each other by intervening insulating sleeves 18. The insulating sleeves 18 must therefore be of good dielectric material and must cover or almost cover the conducting sleeves 16 such that surface flashover is prevented. For AC operation alone, the conducting sleeves 16 may be effectively encased in plastic sheets; however, for DC operation, a small edge 17 of the conducting sleeve 16 must be left exposed for attachment to a resistor divider 21. The end conducting sleeve 16' is connected to the high voltage lead and the conductive sleeve 16" next to the ground shield 22 will be connected to ground. A rounded metal terminal 24 is connected to the high voltage lead at the end of the cable and has a radius large enough such that breakdown will not take place at that point in the terminating medium. If the cable termination does not extend up through a grounded surface, a small ground plane 14 may be formed such as with a metal sheet having rounded external edges slipped over the outer sheath of cable at its termination.

The insulating sleeves 18 may consist of wrappings of insulating tape or may be made from cylindrical lengths of tubing which are shrunk tightly onto the cable insulation 12 by heat or other means or may be made of tapered cylinders of insulation several inches in length. Dielectric grease or plastic may be used to eliminate the air voids under the conducting sleeves. Although heat shrinkable plastic tubes appear to be the best material for insulating sleeves 18, any suitable electrical-mechanical equivalent would work equally well.

The capacitive coupling between adjacent conducting sleeves 16 is a function of the overlapping area of these sleeves and of the dielectric interposed therebetween. Thus, for good AC and surge distribution, the amount of overlap must be such that the series capacitance, $C_s$, between adjacent sleeves is large compared to the capacitance, $C_c$ of a single conducting sleeve to the high voltage inner conductor when calculated for the length of conducting sleeve exposed to the field directly from the high voltage conductor. For approximately equal voltage distribution during a surge, $$(C_s/C_c)^{1/2}$$

should be as large as possible, but it is usually acceptable if it is greater than $\frac{1}{2} n$ where $n$ is the number of conducting sleeves used. The voltage across the end section divided by the average section voltage is approximated by the equation $$\frac{E}{E_{AVG}} = \frac{n}{m} \coth \frac{n}{m}$$

where $$m = \left(\frac{C_s}{C_c}\right)^{1/2}$$

For DC operation, the conducting sleeves may be connected with equal resistors 20. These units must be capable of withstanding the rated voltage and must be high enough in resistance such that they do not overheat. They should also be low enough in resistance such that the current passing through them is large as compared with the stray or leakage currents. A large range of values could be used, and passage of currents from 10 to 1000 microamps at rated voltage would usually be suitable. One possible method of manufacture is to connect small units such as 1/4-watt carbon resistors in series and to then wrap this string spirally around the termination over the conducting and insulating sleeves. This resistor spiral 21 could be placed such that electrical connections can be made to the conductive sleeves 16 at equal resistance intervals.

The termination can then be covered with a final coat of insulating material 26 to provide both mechanical and electrical protection. In addition to keeping the moisture from the apparatus, it will cover up all the projections of the resistors with a high dielectric constant material, and will thus reduce the gradients at these points of irregularity.

This type of termination keeps the radial field around the high voltage conductor inside the cable termination itself which has the solid insulation designed to withstand such high density fields. If this termination is used in a uniform field as found between a ground plane and a high voltage plane of large area, it would not even distort the field and there would be no radial electric field outside of the termination. For somewhat symmetrical ground and high voltage electrodes, the radial field under most configurations would be small compared to the longitudinal field and would not be a cause of electrical breakdown in the terminating medium.

A nonuniform but controlled distribution of voltage along the cable termination may be desired in some cases such as a termination inside a cylindrical or spherical tank. If a termination is used having a voltage distribution along its surface matching that known to be present before the termination is inserted, it will not distort the original electric field. The capacitance division can then be made as desired either by varying the pitch of the conductive sleeves 16 while keeping the overlap constant or by varying the overlap of the conductive sleeves 16 while keeping the pitch constant. The AC voltage between sections will vary inversely as the capacitance. The resistance division can be controlled with the resistance of the units used.

The difference between this invention and a condenser bushing will be pointed out since a condenser bushing also has capacitive division of the insulation. The solid insulation in a condenser bushing is divided into annular sections with thin conducting cylinders. This reduces the distorted field, with high gradients near the central conductor, produced by thick cylindrical sections. Surge and AC voltage can be divided equally between the cylinders if the capacitances are equal. This is accomplished by reducing the cylinder lengths as the radius increases. These lengths decrease almost inversely as the radius, which produces a rapid change in length near the inner radius and less change for bigger radii. Therefore, the insulating surface length between cylinder ends varies greatly for the same voltage change. In other words, the surface of the insulation is divided nonuniformly as determined by the requirement that the gradients in the volume are kept to a minimum. In this invention, the subdivision of voltage is along the insulator surface while in the condenser bushing the subdivision is in the insulator volume. It is the purpose of this invention to try to keep the high gradient in the volume and reduce those outside the volume while the condenser bushing works to reduce the gradients in the solid insulation.

Figure 3:
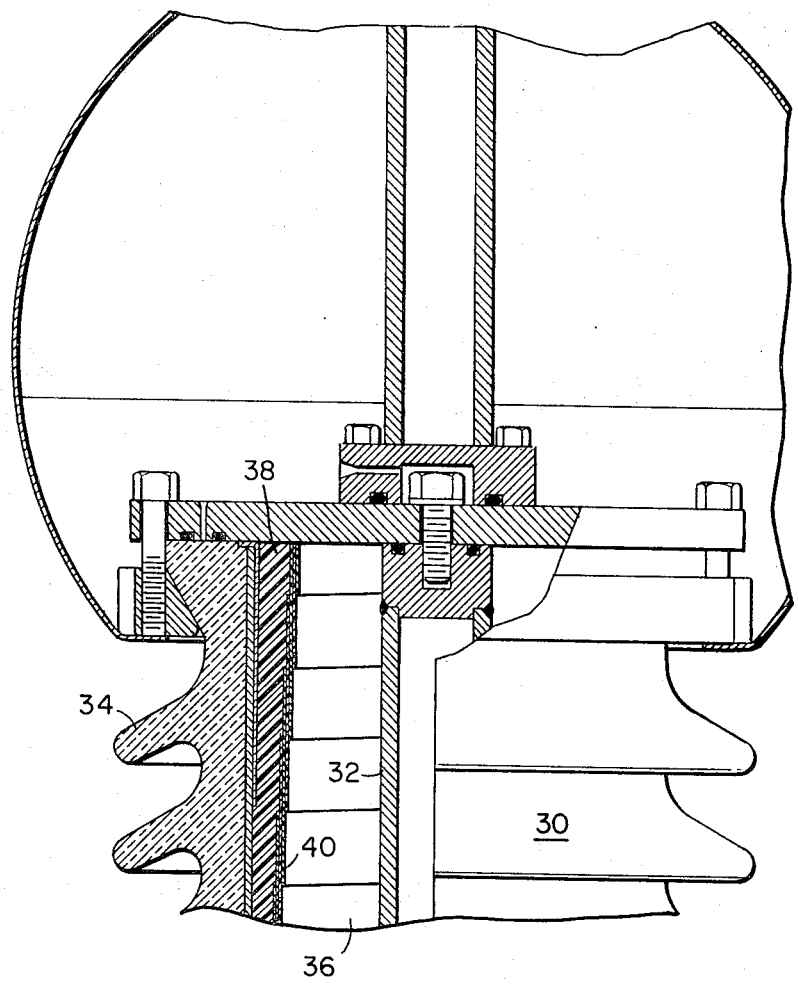
FIG. 3 is a half longitudinal cross section of a gas-insulated cable termination illustrating the placement of the condenser-wrap and adhesive filler.
Figure 3:
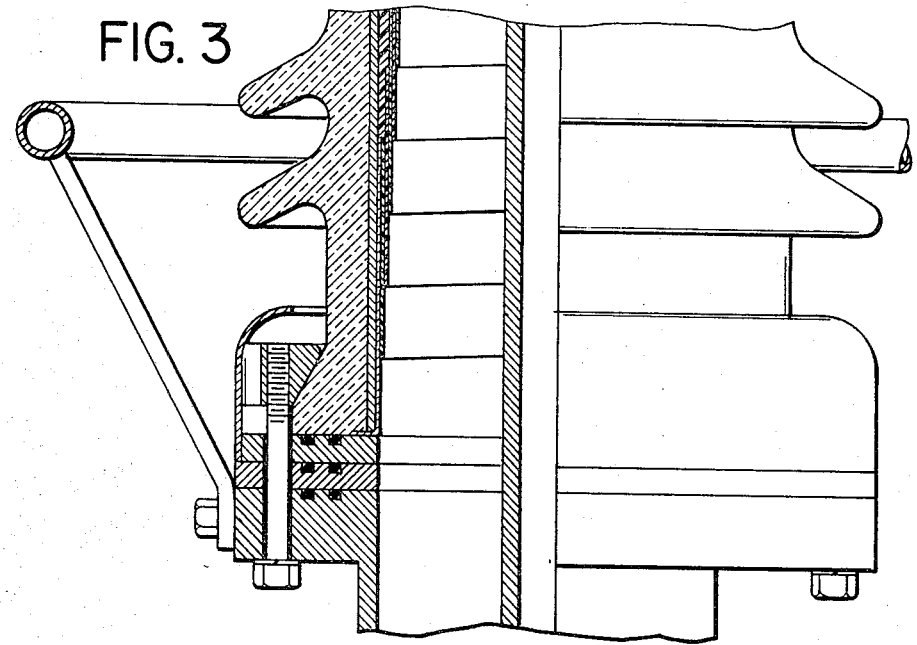

Referring now to FIG. 3 a cable termination for a gas-insulated transmission line is shown and designated generally by the symbol 30. Like the solid insulated cable which maintains the field entirely inside the solid cable insulation, the gas transmission line termination maintains the field in the gas insulating medium 36. The high voltage inner conductor 32 is surrounded by an insulating shell 34 which may be of porcelain allowing the insulating gas 36 to be interposed in the annulus therebetween. Disposed on the inner surface of the porcelain insulator 34 is a condenser wrap 40 and adhesive filler 38 which provides a proper and predetermined capacitive-resistive division for the appropriate voltage level.

Figure 4:
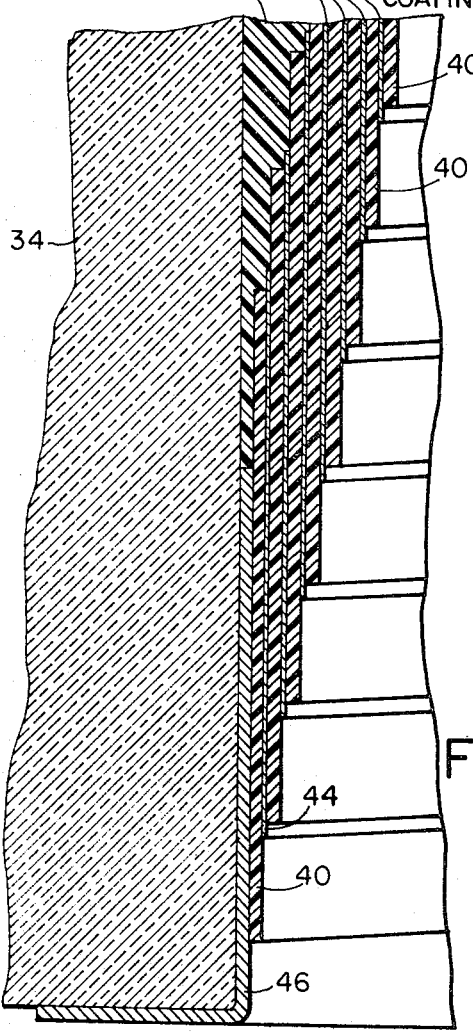
FIG. 4 shows a detailed construction of the condenser-wrap.

In FIG. 4 a more detailed illustration is shown setting forth the detail by which the capacitive-resistive division is achieved. The capacitance division consists of a wrap of resistively coated insulating tape 40 which provides resistive as well as capacitive division at frequencies which are normal or above. Series capacitance is achieved by overlapping the insulating tape windings 40 to provide a predetermined number of turns or series capacitance. The connection to the high voltage conductor and ground is achieved by attaching the edge of the insulating tape winding which is exposed to the respective terminals such as 46. It is found that the resistive current which is limited by heating to a few milliamps is small enough such that capacitive currents divide the voltage. The spiral resistance path has inductance which, although small, is effectively in series with the resistance. The capacitive currents flow linearly down the side of the termination around the whole periphery and are in parallel with the series resistance-inductance.

The gradient control capacitive wrap as shown in FIG. 4 consists basically of windings from a roll of insulating tape 40 which by way of example is .005 inch thick by 3 inches wide Mylar. The Mylar tape is coated with a resistive coating 42 on each side with a small portion 44 left uncoated next to one edge. The uncoated width is on opposite edges on opposite sides such that the exposed surfaces after extension are uncoated. Several thin metal tabs 46 are inserted between the layers at each end and are folded over the ends of the porcelain bushing to form an electrical connection to the metal flanges. In this case the capacitive division is determined by the number of turns of the tape while the resistive division is determined by the type of resistive coating 42 which is applied to each side of the tape.

One method of manufacture that would adhere the coating to the inner wall of the porcelain insulator 34 would be to wind the insulating tape 40 over a Teflon coated tapered mandrel making sure a tight wrap is maintained to make electrical contact at all areas. The ends of the tape should be trimmed to make the ends square. The thin metal tabs 46 would then be inserted between the end turns of the tape and a check should be made for electrical continuity of contacts by measuring the voltage distribution across the tape turns while the ends are excited by a moderately high frequency. Next, a temporary cap could be put on the end of the porcelain cover 34 such that a measured quantity of chemically setting plastic or adhesive filler 38 will come up and fill the spaces between the tape and the porcelain cover when the mandrel is inserted into the porcelain cover. The coating should be good electrically, adhere to the surfaces, and be flexible enough to relieve the thermal expansion stresses. Once the plastic has set, the cap may be removed from the porcelain cover and the mandrel removed.

An alternative to the wrapped insulating tape would consist of a stack of tapered insulating cylinders each several inches long. Conducting sheets between cylinders or application of a conducting coating on the surfaces of the cylinders will make a capacitor of each insulating cylinder. This method does not have the built-in resistive division of the wrapped tape described above but the capacitance division would be suitable for AC and surge distribution.

Although the present invention has been described with a certain degree of particularity, it should be understood that the present disclosure has been made only by way of example and that numerous changes in the details of construction and the combination and arrangement of parts may be resorted to without departing from the scope and spirit of the present invention. For example, the same principles which have been applied to cable terminations may equally be applied with slight modification in the structure to transformer or reactor bushings and other induction apparatus requiring a high voltage transition apparatus. Moreover, the capacitive resistive wrap as described for the gas insulated cable termination may also be advantageously applied to the outside of insulation on a solid insulated cable.

I claim:

1. A high voltage termination apparatus for bringing high voltage from one insulating medium to another comprising:
   a high voltage conductor,
   insulating means surrounding said high voltage conductor
   gradient controlling means surrounding said insulating means for providing a predetermined voltage distribution between said high voltage and ground under AC and surge operating conditions
   protective support means surrounding said gradient controlling means for inhibiting atmosphere contamination
   said gradient controlling means including:
      a plurality of annular conducting members
      a plurality of annular insulating members
      said conducting members and said insulating members alternately arranged in contiguous relationship such that alternate insulating members insulate alternate conducting members, the conducting member at one end electrically connected to said high voltage conductor and the conducting member at the other end electrically connected to ground, and said conducting members partially overlapping one another to confine the electric field produced by said high voltage conductor
   and resistance means connected between said conducting members for providing a predetermined voltage division under DC operating conditions.

2. The high voltage termination apparatus as set forth in claim 1 wherein said DC voltage distribution is made to approximately match the electric field present before insertion of the high voltage transitional device by varying the resistance from one conducting member to the next.

3. The high voltage termination apparatus as set forth in claim 1 wherein said insulation means is gas and wherein said gradient controlling means comprises a spirally wound capacitive wrap applied to the inner surface of said protective support means and which is resistively coated on both sides except for a small portion on opposite edges of opposite sides which is exposed, said capacitive wrap connected to the high voltage conductor at one end and to ground potential at the other end.

4. The high voltage termination apparatus as set forth in claim 3 wherein the AC and surge voltage division of said capacitive wrap is made substantially uniform by varying the width of said condenser wrap.

5. The high voltage termination apparatus as set forth in claim 1 wherein said insulating means is gas and wherein said gradient controlling means comprises a plurality of interlocking tapered cylinders having a conducting layer interposed between adjacent tapered cylinders for providing a capacitive division between said high voltage conductor and ground.

References Cited

UNITED STATES PATENTS

| | | | |
|---|---|---|---|
| 1,868,962 | 7/1932 | Atkinson | 174—73 |
| 2,068,624 | 1/1937 | Atkinson | 174—73 |
| 2,219,910 | 10/1940 | Webb et al. | 174—73 |
| 2,276,923 | 3/1942 | Burr | 174—143 |
| 2,386,185 | 10/1945 | Beaver et al. | 174—73 |
| 2,606,950 | 8/1952 | Macardier | 174—143 X |

FOREIGN PATENTS

| | | |
|---|---|---|
| 452,396 | 8/1936 | Great Britain. |
| 953,642 | 3/1964 | Great Britain. |

LARAMIE E. ASKIN, Primary Examiner

U.S. Cl. X.R.

174—73 143